Sept. 11, 1928.  J. W. ALLEN  1,683,943

WIPING DEVICE FOR WINDSCREENS, WINDOWS, AND THE LIKE

Filed Aug. 31, 1927

INVENTOR:
John W. Allen

Patented Sept. 11, 1928.

1,683,943

UNITED STATES PATENT OFFICE.

JOHN WILLIAM ALLEN, OF BURNLEY, ENGLAND.

WIPING DEVICE FOR WIND SCREENS, WINDOWS, AND THE LIKE.

Application filed August 31, 1927, Serial No. 216,734, and in Great Britain September 6, 1926.

This invention relates to a wiper that is primarily intended for removing rain and snow from windscreens and other vehicle windows, and has for its chief object to introduce an improved form of apparatus of the kind in which a strip of rubber or other suitable material adapted to be maintained in contact with the surface of the glass is mounted in a holder adapted to be traversed up and down across the whole surface of the glass so that the latter is entirely free from rain or other moisture and an entirely clear surface is obtained.

According to this invention the holder for the wiper is mounted on a bar the ends of which engage guides on the windscreen or window frame and are connected by links to arms fixed on a shaft mounted in bearings attached to a portion of the wind screen or window frame or to any suitable part of the vehicle and actuated by a handle that is preferably situated in proximity to the steering wheel.

In order that the said invention may be clearly understood and readily carried into effect, the same is described more fully with reference to the accompanying drawings, in which:—

Figure 1:
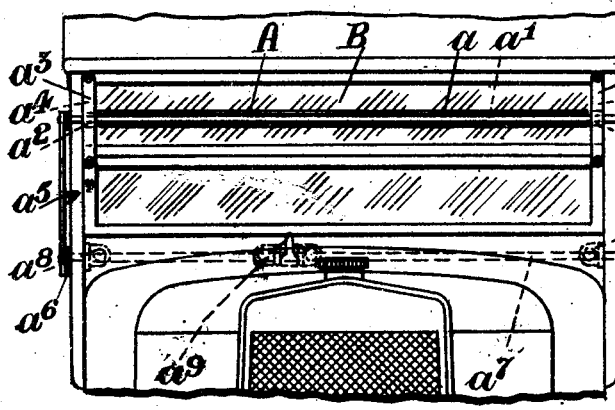
Figure 2:
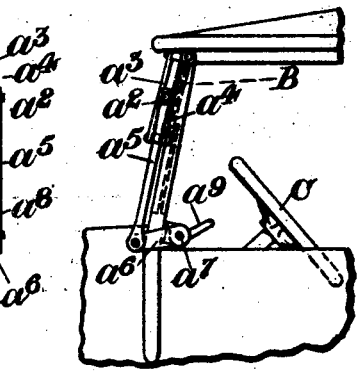
Figure 3:
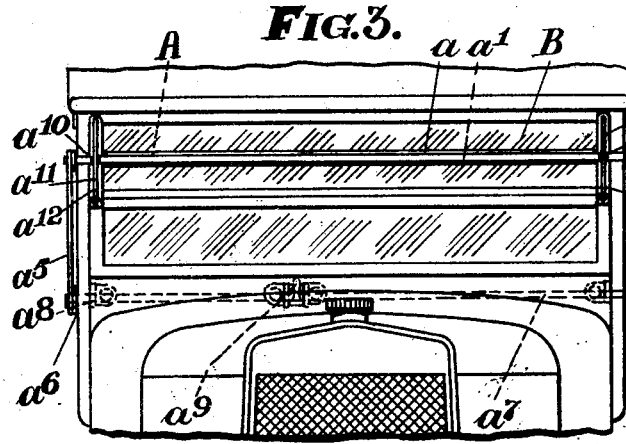
Figure 4:
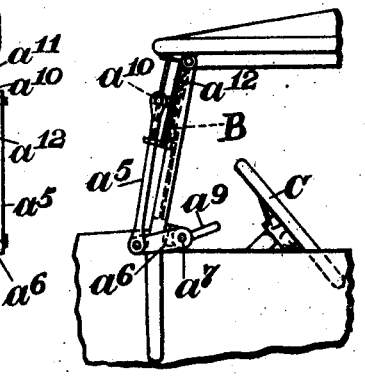
Figure 5:
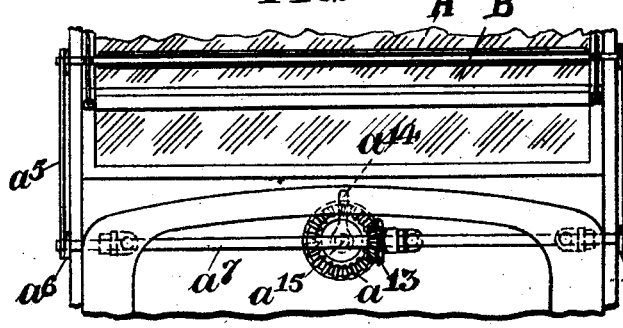
Figure 6:
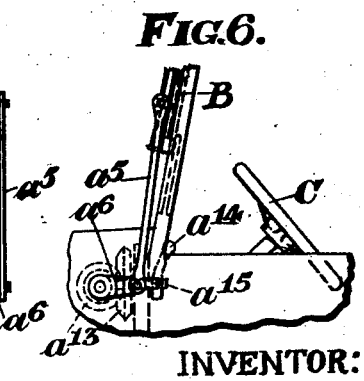

Fig. 1 is a front elevation, and Fig. 2 a side elevation of part of a motor car fitted with a windscreen wiper in accordance with this invention, the wiper being shown in its bottom position, Figs. 3 and 4 are similar views to Figs. 1 and 2 showing the wiper in a mid-position and guided in a slightly different fashion, and Figs. 5 and 6 show a modified arrangement with the operating shaft situated outside the vehicle.

In the example shown in Figs. 1 and 2 the wiper A comprises a strip of rubber adapted to be clipped in a metal clip $a$ which is bolted or otherwise secured at intervals to a metal bar $a^1$. The latter extends across the whole width of the windscreen B and its ends may pass through guide blocks $a^2$ which are free to slide between guides $a^3$, $a^4$ attached to the frame of the windscreen. The ends of the bar are connected by links $a^5$ to arms $a^6$ fixed on the ends of a shaft $a^7$ which is mounted parallel with the bar in bearings $a^8$ attached to a portion of the windscreen or to any other suitable part of the vehicle and such shaft is provided with a handle $a^9$ which may be situated in proximity to the steering wheel C so that it can be readily actuated by the driver to move the wiper up and down across the whole surface of the windscreen. When the driver releases the handle the wiper may be returned to its original position positively, or by the action of one or more springs. The arms and links which connect the shaft and wiper bar work in planes at right angles to the plane of movement of the wiper bar. The modification shown in Figs. 3 and 4 is the same as that shown in Figs. 1 and 2 with the exception that the bar $a^1$ is slotted or recessed at $a^{10}$ to engage guide bars $a^{11}$ carried by brackets $a^{12}$. In the modification shown in Figs. 5 and 6 the shaft $a^7$ is situated in front of the wind-screen or outside the vehicle and actuated by bevel gearing $a^{13}$ from a handle $a^{14}$ fixed on a shaft $a^{15}$. If desired the wiper may be actuated automatically and for this purpose it may be arranged to be put into gear with mechanism which may be actuated by the engine or by a separate motor which will impart a reciprocating movement to the wiper as and when required. In applying the invention to the window of a motor vehicle, the apparatus is suitably constructed and arranged so that it can be operated by the occupants within the vehicle, and in applying it to a large vehicle such for example as a tram car or bus, the wiping apparatus may be arranged to extend along the windows at both sides and be actuated to clear all the windows simultaneously or any of them independently.

What I claim as my invention and desire to secure by Letters Patent in the United States is:—

A wiper for windows comprising a wiper member extending across a window, means for guiding said member along the surface of the window, a shaft mounted for rotation parallel with said member, a plurality of arms secured to the shaft, and links connecting said arms and member, said arms working in planes at right angles to the plane of movement of the wiper.

In testimony whereof I have hereunto affixed my signature.

JOHN WILLIAM ALLEN.